United States Patent [19]

Lavallee

[11] Patent Number: 4,599,387

[45] Date of Patent: Jul. 8, 1986

[54] TETRAALKYL TITANATE MODIFIED NYLON MAGNET WIRE INSULATION COATING

[75] Inventor: Francois A. Lavallee, Fort Wayne, Ind.

[73] Assignee: Essex Group, Inc., Fort Wayne, Ind.

[21] Appl. No.: 732,534

[22] Filed: May 10, 1985

Related U.S. Application Data

[62] Division of Ser. No. 620,310, Jun. 13, 1984.

[51] Int. Cl.$^4$ ............................................. C08L 77/00
[52] U.S. Cl. ..................................... 525/419; 524/606
[58] Field of Search ......................... 524/606; 525/419

[56] References Cited

U.S. PATENT DOCUMENTS

| | | | |
|---|---|---|---|
| 3,830,777 | 8/1974 | Lasseter | 524/606 X |
| 3,917,892 | 11/1975 | Kawaguchi et al. | 428/383 |
| 3,922,465 | 11/1975 | Kawaguchi et al. | 428/383 |
| 4,206,261 | 6/1980 | Laganis et al. | 528/289 X |
| 4,480,007 | 10/1984 | Pauze | 525/424 X |

*Primary Examiner*—Lorraine T. Kendell
*Attorney, Agent, or Firm*—Harry J. Gwinnell

[57] ABSTRACT

A magnet wire enamel having improved runnability and insulating properties is described comprising nylon containig 0.5% to 3.5% by weight tetraalkyl titanate. The nylon can be a sole coat, outermost coating, or bond coat.

2 Claims, No Drawings

TETRAALKYL TITANATE MODIFIED NYLON MAGNET WIRE INSULATION COATING

This is a division of application Ser. No. 620,310 filed on June 13, 1984.

DESCRIPTION

1. Technical Field

The field of art to which this invention pertains is polyamide coating compositions, and particularly nylon coating compositions on insulated magnet wire substrates.

2. Background Art

Because of their relative low cost and the desirable handling properties they provide to polymer insulated magnet wire, nylon topcoats have been used in the magnet wire area for several years. However, such coatings are not without problems. For example, on high temperature wire such as magnet wire coated with polyester base coats, nylon overcoats have suffered from such things as ring cracks (circular cracks perpendicular to the major axis of the coated wire) particularly in dry weather and such cracks can cause catastrophic wire failure. Furthermore, because of the relatively low solidification point of nylon, temperature changes can cause great difficulty in providing a smooth coating on wire. Part of this problem results from the fact that when applying plural coatings of the nylon, successive coats redissolve previously applied coats, thus producing smoothness problems.

Accordingly, what is needed in this art is a nylon composition which overcomes such problems.

3. Disclosure of Invention

The present invention is directed to an improved magnet wire enamel composition comprising nylon modified by reaction with a tetraalkyl titanate. The tetraalkyl titanate reacts with the amine and carboxyl groups on the nylon molecule resulting in a nylon modified dimer with both improved application to magnet wire substrates and improved wire properties after application to the magnet wire substrates. The tetraalkyl titanates are typically reacted into the nylon in an amount of about 0.25 to about 10% by weight of the nylon present in the enamel composition.

Another aspect of the invention is electrically insulated magnet wire containing a plurality of polymer layers of insulation where at least one of the layers comprises the above-described nylon enamel.

Another aspect of the invention comprises a method of forming polymer insulated magnet wire having a plurality of polymeric insulating layers where at least one of the layers is the nylon material described above.

These and other advantages of the present invention will become more apparent from the following description.

BEST MODE FOR CARRYING OUT THE INVENTION

Any nylon material can be catalyzed with the titanate described herein. Typically nylon 6; nylon 11; nylon 6,6; nylon 6,12; etc. are used.

The tetraalkyl titanate used has the formula $(RO)_4Ti$ where R is an alkyl group typically containing at least three carbon atoms. Preferred alkyl titanates are tetrabutyl titanate, tetrakis (2-ethylhexyl) titanate and tetraisopropyl titanate. Typically the nylon layer is used as an overcoat on such things as standard polyester (such as THEIC polyester), polyurethane or polyvinyl formal resins. However, it can also be used in conventional constructions as an intermediate layer (bond coat) between multiple layers of, e.g. polyurethane or as a sole coat.

Although not wishing to be bound by any particular theory it is believed that the alkyl titanate-nylon reaction occurs as follows:

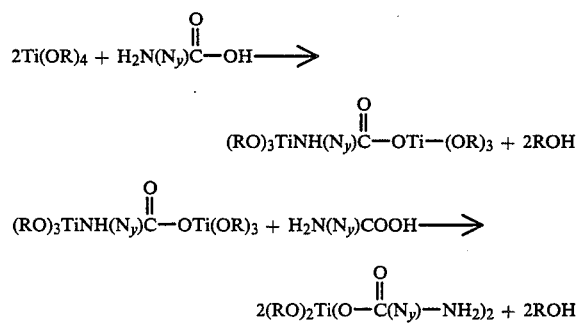

where

represents the nylon moiety. This new molecule

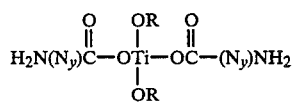

is very stable because bonding two carboxyl

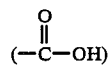

groups to a titanium center uses up all the coordination sites on the titanium.

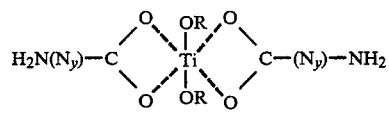

This molecule, which we will refer to as a nylon dimer, has a chemistry of its own when applied to the wire substrate. For example, when applied to a previously applied base coat such as an hydroxyl rich polyester as discussed above, the following reactions take place:

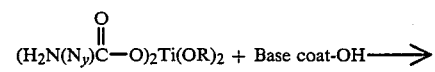

-continued

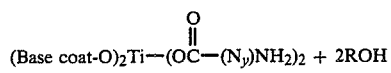

The base coat surface is hydroxyl rich and can react with one or two of the remaining butoxy groups on the titanium nylon dimer. The above equation is written for the reaction of two alkoxy groups.

In a sole nylon coat or in the body of the film which does not interact with other layers the following reaction takes place:

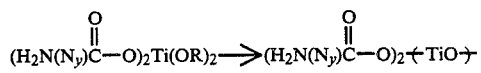

where the O on the Ti reacts with available

While the polymers according to the present invention can be used on any electrical conductor they are preferably used on wires and specifically on magnet wires. The wires are generally copper or aluminum and range anywhere from 4 AWG to 42 AWG (American Wire Gauge) in diameter, with 18 AWG being the most commonly coated wire. Wire coatings can be anywhere from 0.1 to 5 mils or any thickness desired and preferably about 3.2 mils on 18 AWG wire. As stated above the coatings can be used as part of a multicoat system in combination with a conventional polymer insulation such as polyesters, polyurethanes, polyvinyl formal, polyimides, polyamideimides, etc. and combinations thereof. The polymer coatings can also contain lubricants either externally on the nylon or admixed with the nylon.

Typical multicoat systems include such things as THEIC polyester base coats with nylon topcoats with the nylon comprising about 20 to about 25% of the total thickness. When used as a bond coat, i.e. an intermediate layer between two additional layers of polymer insulation (such as a polyurethane base coat, the nylon bond coat, and a polyvinyl butyral topcoat, i.e. a solderable composition) the nylon typically represents about 5% to about 10% of the total wire product.

The enamels according to the present invention can be applied by any conventional means such as coating dyes, roller or felt application with viscosity adjustments made accordingly. Viscosity adjustments can be made by dilution with appropriate enamel solvents or diluents. Such solvents are typically cresylic acids, and methyl pyrrolidone, N,N-dimethyl or N,N-diethyl formamide and N,N-diethyl acetamide, along with any conventional hydrocarbon diluents such as xylene, Solvesso 100 (Exxon) or D59 hydrocarbon (Drake Petroleum Company).

Conventional ovens can be used to heat treat the magnet wire after application of the nylon. Typical inlet oven temperatures are of the order of 500° F. to 700° F., preferably about 580° F. and outlet oven temperatures of about 800° F. to 1100° F., and preferably about 900° F. are used for drying and curing.

In order to demonstrate the improved and unexpected properties of nylon modified with the tetraalkyl titanate according to the present invention, a series of experiments were run to ascertain the effects of various additives on the enamel. A series of experiments were carried out wherein the parts per hundred by weight (phr) of tetrabutyl titanate (TBT) in the enamel was varied from 0.05 to 1.0.

The following tables show the properties of wire made from TBT modified scrap nylon at a series of TBT concentrations.

These enamels were tested on 18 AWG copper with THEIC polyester base coat in a Df (250°) range varying from 0.08 to 0.17.

|  | Mandrel Pull | | | | |
|---|---|---|---|---|---|
|  | NT* | NT | NT | 13 | 16 |
| phr TBT | 0 | .05 | .1 | .5 | 1.0 |
|  | Heat Shock | | | | |
|  | NT | NT | OK | OK | OK |
| phr TBT | 0 | .05 | .1 | .5 | 1.0 |

*not tested - failure obvious

|  | Runnability | | | | |
|---|---|---|---|---|---|
|  | 8 | 8 | 8½ | −9 | −9 |
| phr TBT | 0 | .05 | .1 | .5 | 1.0 |
|  | Flex | | | | |
|  | NT | NT | NT | OK | OK |
| phr TBT | 0 | .05 | .1 | .5 | 1.0 |

As can readily be seen from the tables the improvement in nylon occurs when 0.5% TBT is used. This corresponds to a 1:1 molar equivalency of nylon to TBT.

In order to determine whether this effect would occur with virgin nylon, a virgin Vydyne ® (Monsanto) 21 enamel (nylon 6,6) was run against a modified sample of the same enamel to the first failure of either, again using THEIC polyester as base coat and 18 AWG wire construction.

|  | Tg | Mandrel Pull | Heat Shock | Snap/Flex | Df (250°) | Speed |
|---|---|---|---|---|---|---|
| Modified Virgin Vydyne 21 (1 phr TBT) | 435 | 18 | OK | OK | .06 | 45 |
| Unmodified Virgin Vydyne 21 | 435 | 1 | NT | Fail | .06 | 45 |

From the above table it can be seen that this TBT modification also improves a virgin nylon.

Because Ti (OR)$_4$ compounds (where R is alkyl) have a tendency to hydrolyze in the presence of moisture, experiments were carried out to verify the hydrolytic stability of the nylon TBT dimer on wire.

Sample A is a standard nylon coated wire simply aged for nine days.

Sample B is a sample of TBT modified nylon wire over THEIC polyester base coat soaked in water for two hours.

Sample C is a sample of TBT modified nylon wire over THEIC polyester where the wire was subjected to varying humidity −0 to 100% in 45 minute intervals for five days at an average of 45° C.

|  | Sample A | Sample B | Sample C |
|---|---|---|---|
| Mandrel Pull | 13 | 12 | 11 |
|  | 13 | 13 | 13 |
|  | 12 | 13 | 14 |

In a concurrent set of experiments TBT was added to a monoethanolamine equilibrated nylon enamel which contains a relatively large amount of acetic acid. When this is done the following reaction occurs which strongly competes with dimer formation.

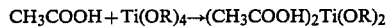

$$CH_3COOH + Ti(OR)_4 \rightarrow (CH_3COOH)_2Ti(OR)_2$$

In order to determine what changes had been made to the nylon itself, modified and unmodified nylon enamels were run as sole coats. Essentially there was no change in general properties of the nylon coating when TBT was added as a modifier.

The Tg and melt point of modified and unmodified nylons were compared and found not to have been changed by the dimerization. This absence of change was to be expected. TBT treated nylon still passes the HCl acid blush test.

EXAMPLE 1

One part per hundred by weight oof tetrabutyl titanate (TBT) was reacted with nylon made from scrap nylon 6,6 fibers. A 5% by weight mixture of this modified nylon was made up with cresol, phenol, and/or xylene by mixing for one-half hour to form a homogeneous solution. This mixture was coated on 18 AWG wire as described above. The change in properties were as shown in the table below.

|  | Df (250°) | Mandrel Pull Dry | Snap/Flex |
|---|---|---|---|
| Enamel | 0.05 | 1 | Fail |
| Without TBT | 0.16 | 7 | Pass |
|  | 0.21 | 14 | Pass |
| Same Enamel | 0.05 | 12 | Pass |
| With 3.5% TBT | 0.14 | 12 | Pass |
|  | 0.21 | 13 | Pass |

In this table Df values of between about 0.12 and about 0.28 represent a cured enamel with values less than about 0.11 representing overcure. In the mandrel pull column, values greater than about 10 represent a "pass".

EXAMPLE 2

The same enamel as in Example 1 without TBT was run by coating an 18 AWG wire at a rate of speed of 45 feet per minute. Its runnability was so poor that it could not be tested. This same enamel was tested with 3.5% TBT. The results are as shown below:

|  | Df (250°) Unuseable | Mandrel Pull Dry | Heat Shock | Snap/Flex |
|---|---|---|---|---|
| Same enamel | 0.04 | 10 | Pass | Pass |
| With 3.5% TBT | 0.14 | 13 | Pass | Pass |
|  | 0.20 | 14 | Pass | Pass |

EXAMPLE 3

An enamel is made up using general purpose nylon Vydyne 21 from Monsanto and compared to the same enamel with 1% tetrabutyl titanate. The results are as shown below:

|  | Df (250°) | Tg | Mandrel Pull Dry | Snap/Flex |
|---|---|---|---|---|
| Vydyne 21 | .06 | 435 | 1 | Fail |
|  | .04 | 432 | 1 | Fail |
|  | .07 | 425 | 14 | Pass |
| Vydyne 21 With 1% TBT | .06 | 435 | 10 | Pass |

The higher the Tg the greater the degree of cure. For example, values of 425 are within the cure range whereas values of 435 are above the normal cure range.

EXAMPLE 4

A series of nylon enamels were made using amounts of tetrabutyl titanate varying from 0.05 to 3.5%. Use of 0.05% and 0.1% parts per hundred did improve the runnability of the nylon enamel (bead free). However, use of 0.5% and 1% did show the same dramatic effect produced by the 3.5% level.

As stated above besides providing improved sole coats and topcoats for various polymer constructions, the modified nylon according to the present invention also produces an improved intermediate layer (bond coat) in multiple layer constructions.

Although this invention has been shown and described with respect to detailed embodiments thereof, it will be understood by those skilled in the art that various changes in form and detail thereof may be made without departing from the spirit and scope of the claimed invention.

I claim:

1. A magnet wire enamel composition comprising nylon reacted with tetraalkyl titanate in an amount of about 0.5% to 3.5% by weight of the nylon present in the enamel composition.

2. The magnet wire enamel of claim 1 wherein the titanate is selected from the group consisting of tetrabutyl titanate, tetrakis (2-ethylhexyl) titanate and tetraisopropyl titanate.

* * * * *